(12) United States Patent
Ji et al.

(10) Patent No.: US 7,532,689 B2
(45) Date of Patent: May 12, 2009

(54) COMBINING COEFFICIENT ESTIMATION APPARATUS CAPABLE OF COMPENSATING FOR PHASE NOISE OF OFDM SYSTEM AND COMBINING COEFFICIENT ESTIMATION METHOD THEREOF

(75) Inventors: Yi-Jhih Ji, Taipei County (TW); Ta-Sung Lee, Hsin-Chu (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 613 days.

(21) Appl. No.: 11/164,027

(22) Filed: Nov. 8, 2005

(65) Prior Publication Data
US 2006/0109921 A1 May 25, 2006

(30) Foreign Application Priority Data
Nov. 19, 2004 (TW) .............................. 93135774 A

(51) Int. Cl.
*H04B 7/10* (2006.01)

(52) U.S. Cl. .................. 375/347; 375/260; 375/267

(58) Field of Classification Search .................. 347/347, 347/260, 267
See application file for complete search history.

(56) References Cited

U.S. PATENT DOCUMENTS

2003/0123530 A1* 7/2003 Maeda et al. ............... 375/148

* cited by examiner

*Primary Examiner*—Kevin Y Kim
(74) *Attorney, Agent, or Firm*—Winston Hsu

(57) ABSTRACT

An apparatus for receiving OFDM signals via at least two antennae is disclosed. The apparatus includes a converter for converting a plurality of OFDM symbols received via each antenna to a plurality of sub carrier signals, wherein each sub carrier signal corresponds to one of a plurality of sub carriers; a combining unit for combining the sub carrier signals, which are obtained via each antenna and correspond to a specified sub carrier, based on a combining coefficient vector to form a combined signal; a recovery unit for recovering a desired signal based on the combined signal corresponding to the specified sub carrier; and a combining coefficient estimation unit for updating the combining coefficient vector corresponding to the specified sub carrier based on the desired signal corresponding to the specified sub carrier and the sub carrier signals, which correspond to the sub carrier and are obtained via each antennae.

16 Claims, 3 Drawing Sheets

COMBINING COEFFICIENT ESTIMATION APPARATUS CAPABLE OF COMPENSATING FOR PHASE NOISE OF OFDM SYSTEM AND COMBINING COEFFICIENT ESTIMATION METHOD THEREOF

BACKGROUND

The present invention relates to a combining coefficient estimation apparatus and a combining coefficient estimation method, and more particularly, to a combining coefficient estimation apparatus capable of compensating for phase noise of an OFDM system and a related combining coefficient estimation method.

Generally speaking, the orthogonal frequency division multiplexing (OFDM) technology is widely used in wireless communication system for its high special efficiency and lower multi paths distortion. The OFDM scheme divides available spectrum into large number of sub carriers and distributes communication information into some of those sub carriers as data sub carriers, other sub carriers which carry pilot information as pilot sub carriers. The pilot information contains known values and their respective received values which indicate the channel effect. An example of the usage of OFDM technology is the Digital Video Broadcasting Terrestrial (DVB-T) which has been standardized in European.

In wireless communication systems, the presence of multi paths causes fading of the received signal strength at a receive device. The fading of the received signal can cause the received signal level to drop significantly. A well-known practice of combating fading is to use a technique called "diversity". In a generic sense, diversity is the practice of transmitting and/or receiving multiple copies of the signal and combining these copies in some optimal fashion. There are several methods of implementing diversity. One of the more popular forms of diversity is "receive spatial diversity", in which multiple copies of the transmitted signal are received over multiple receive antennae The reason why exploiting receive spatial diversity improves receiver performance can be understood from the following line of reasoning. In a fading environment in which the fading processes are uncorrelated on the receive antennae, it is highly unlikely that all antennae of the receive array will simultaneously experience a severe drop in signal level. As a result, it is highly likely that at least one antenna element of the receive array is not in a fade, which means that at least one receive antennae is receiving a high-powered copy of the transmitted signal. The receiver will have difficulty when all receive antennae simultaneously go into a deep fade because no receive antaean can provide a high-powered version of the transmitted signal, and decoding errors will be highly likely. If the fading processes are all highly correlated, then all receive antennae will tend to go in and out of fades at the same time. When fades do occur in this case; the receiver will have difficulty decoding the signal because all antennae have faded simultaneously.

The "receive spatial diversity" requires the received signals of the multiple receive antennae combining in some optimal fashions, such as maximal ratio combining (MRC). The MRC technique combines the signals on the receive array to maximize the signal to noise ratio of the combined signal. The implementation of MRC refers to the channel effect of the communication channel. Due to the assumption of slow fading, the channel effect is stationary within several OFDM symbols. For several consecutive OFDM symbols, the transmission of pilot information estimates the channel effect of the pilot sub carriers then the interpolation technique is applied to obtain channel effect of the data sub carriers.

The frequency offset and instantaneous frequency drift of the local oscillator occurs at the receiver, which is called as phase noise of the received signals. The effect of phase noise degrades the receiving performance with two aspects as common phase error (CPE) and inter-carriers interference (ICI). The CPE causes each sub carrier signal of the OFDM symbol to shift by a fixed angle, which could be corrected by the channel estimation with pilot sub carriers. However, ICI makes the loss of orthogonal property of sub carriers, which is often regarded as the random noise effects, is hard to remove by the channel estimation.

Please refer to FIG. 1. FIG. 1 is a frequency response of a related art least square channel estimation method. After the receiver performed channel estimation of pilot sub carriers $P_1$, $P_2$, $P_3$, and $P_4$ corresponding to the pilot signals, the frequency response of data sub carriers $S_1$, $S_2$, $S_3$, $S_4$, $S_5$, and $S_6$ can be obtained through linear interpolation at the frequency domain.

The effect of phase noise degrades the accuracy of the channel estimation of the pilot sub carriers according to the least square channel estimation method. The following frequency domain interpolation further degrades the channel estimation of the data sub carriers. Therefore, phase noise effect should be suppressed to upgrade accuracy of the channel estimation, thus to improve the performance of the wireless communication receiving system.

SUMMARY

One objective of the present invention is to provide a combining coefficient estimation capable of compensating for phase noise, and a related method, to solve the above-mentioned problem.

According to an exemplary embodiment of the claimed invention, a combining coefficient estimation apparatus capable of compensating for phase noise in a receiver that receives a RF signal from at least an antenna is disclosed. The combining coefficient estimation apparatus comprises: a converter for converting the OFDM symbols received via each antenna to a plurality of sub carrier signals, wherein each sub carrier signal corresponds to one of a plurality of sub carriers; a combining unit for combining the sub carrier signals, which are obtained via each antenna and correspond to a specified sub carrier, based on a combining coefficient vector to form a combined signal; a recovery unit for recovering a desired signal based on the combined signal corresponding to the specified sub carrier; and a combining coefficient estimation unit for updating the combining coefficient vector corresponding to the specified sub carrier based on the desired signal corresponding to the specified sub carrier and the sub carrier signals, which correspond to the sub carrier and are obtained via each antenna.

According to an exemplary embodiment of the claimed invention, a combining coefficient estimation method capable of compensating for phase noise in a receiver that receives a RF signal from at least an antenna is disclosed. The method comprises: converting OFDM symbols received via each antennae to a plurality of sub carrier signals, wherein each sub carrier signal corresponds to one of a plurality of sub carriers; for a specified sub carrier, combining the sub carrier signals, which are obtained via each antenna and corresponds to the specified sub carrier, based on a combining coefficient vector to form a combined signal; recovering a desired signal based on the combined signal corresponding to the specified sub carrier; and updating the combining coefficient vector based on the desired signal corresponding to the specified sub carrier and the sub carrier signals, which correspond to the specified sub carrier and are obtained via each antennae.

The present invention combining coefficient estimation apparatus and related method generates a desired signal by simulating a signal transmitted from a transmitter, and utilizing an operation of combining coefficient estimation to obtain a new combining coefficient to update the initial combining coefficient corresponding to the channel estimation value obtained through the least square channel estimation method. The present invention combining coefficient estimation apparatus and related method is capable of compensating for phase noise through adjusting the channel estimation value from the least square channel estimation method, and therefore raises the signal receiving quality of an OFDM system.

These and other objectives of the present invention will no doubt become obvious to those of ordinary skill in the art after reading the following detailed description of the preferred embodiment that is illustrated in the various figures and drawings.

DETAILED DESCRIPTION

It is an object of the present invention is to provide a combining coefficient estimation apparatus applied in an OFDM receiving apparatus and a related method with adaptive combining coefficients to mitigate the phase noise effect as above mentioned.

Figure 1:
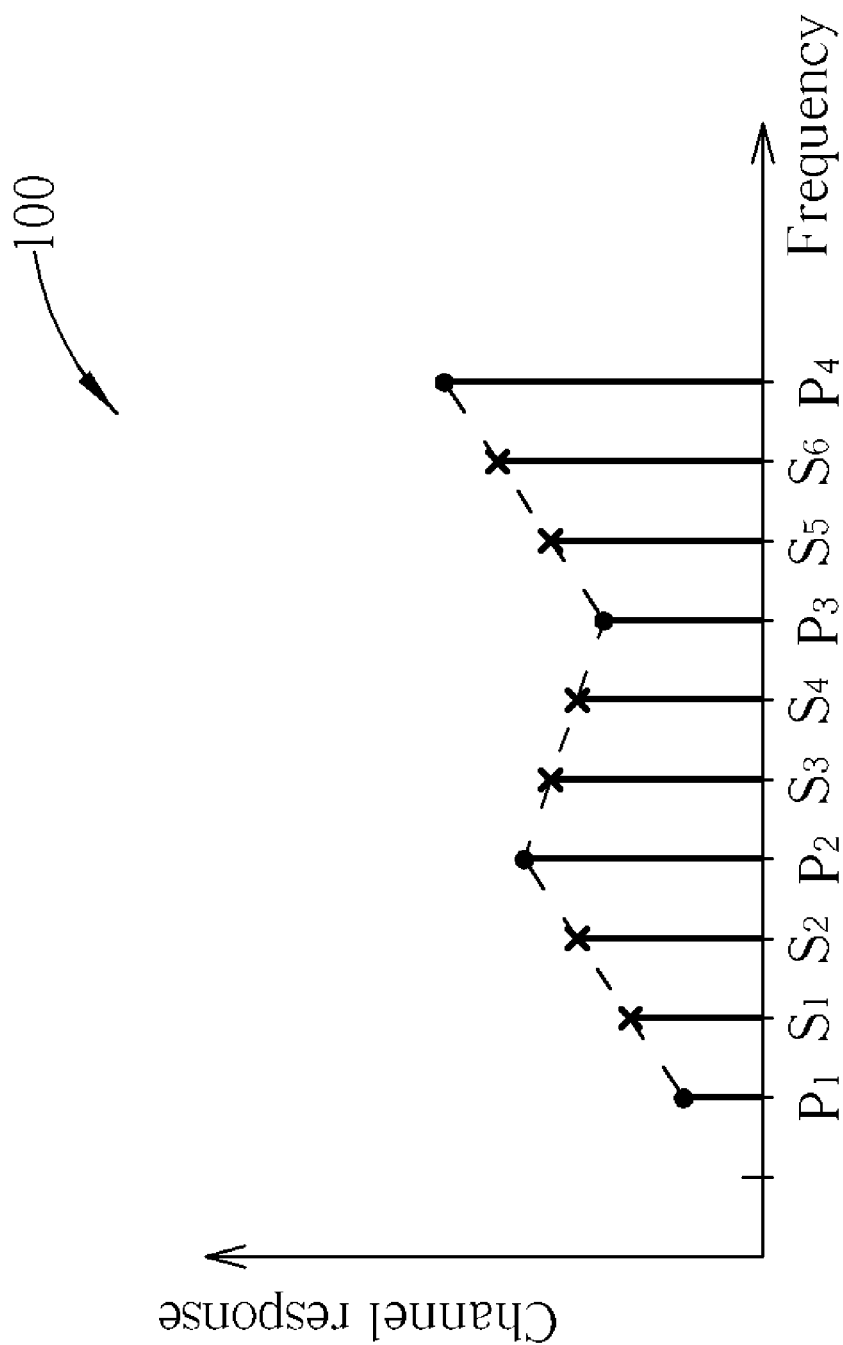
FIG. 1 is a frequency spectrum of a related art least square channel estimation method.
Figure 2:
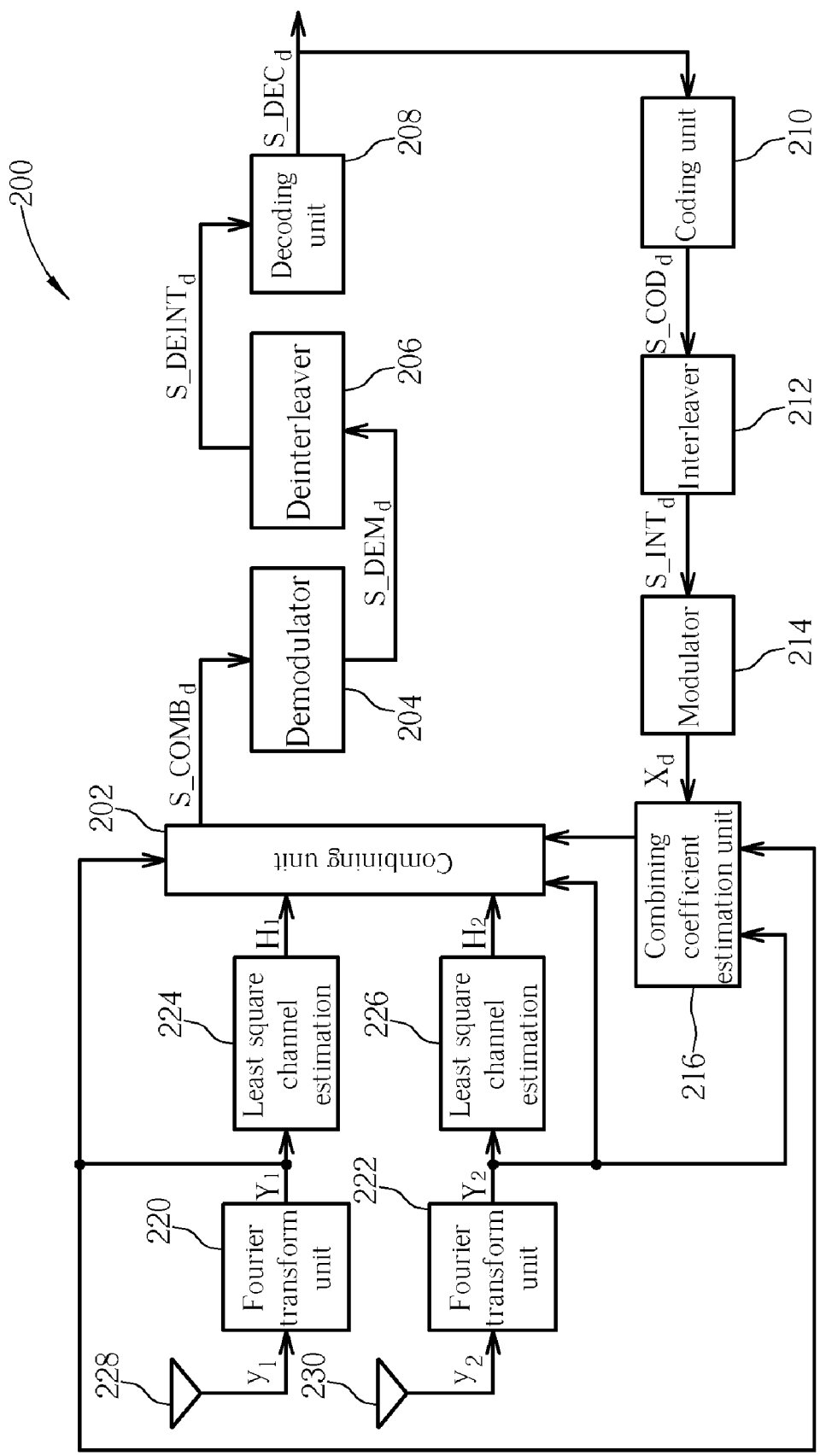
FIG. 2 is a schematic diagram of a combining coefficient estimation apparatus according to a first embodiment of the present invention.

Please refer to FIG. 2. FIG. 2 shows a schematic diagram of a combining coefficient estimation apparatus 200 applied in an OFDM receiving apparatus according to a first embodiment of the present invention. The combining coefficient estimation apparatus 200 comprises a combining unit 202, a demodulator 204, a de-interleaver 206, a decoding unit 208, a coding unit 210, an interleaver 212, a modulator 214, and a combining coefficient estimation unit 216. Additionally, in the present invention, the combining coefficient estimation apparatus 200 further comprises a plurality of antennae 228 and 230, a plurality of Fourier transform units 220 and 222, and a plurality of least square channel estimation units 224 and 226. The plurality of antennae, Fourier transform units, and least square channel estimation units are well known to those skilled in the related art, and further discussion is thus omitted for the sake of brevity. The Fourier transform unit 220 translates a time domain signal of an OFDM symbol vector $y_1(n)$ from the first antenna 228 into an OFDM sub carriers signal vector $Y_1(n)$, where n is the symbol index which specifies the OFDM symbols within an OFDM signal. As known to those skilled in the related art, the OFDM symbol vector $y_1(n)$ can be further expressed to be $y_1(n)=[y_{1,0}(n), y_{1,1}(n), y_{1,2}(n), \ldots, y_{1,K-1}(n)]$, where K is the length of the OFDM symbol, $y_{1,i}(n)$ denotes the i-th time-domain signal at the i-th time point of the n-th OFDM symbol received via the first antenna. The OFDM sub carriers signal vector $Y_1(n)$ can be further represented as $Y_1(n)=[Y_{1,0}(n), Y_{1,1}(n), Y_{1,2}(n), \ldots, Y_{1,K-1}(n)]$, where $Y_{1,k}(n)$ represents the $k^{th}$ sub carrier signal corresponding to the $n^{th}$ symbol from the first antenna. $Y_{1,i}(n)$ denotes the i-th sub-carrier signal of the n-th OFDM symbol received via the first antenna. Similarly, the Fourier transform unit 222 is utilized to translate a time domain signal of an OFDM symbol vector $y_2(n)$ from the second antenna 230 into an OFDM sub carriers signal vector $Y_2(n)$. For the sake of brevity, the symbol index n is omitted below. Please note that, in this embodiment, an RF signal in a transmitter is transmitted through two different channels and received from the different antennae 228 and 230 to respectively generate the OFDM symbol vectors $Y_1$, $Y_2$. Then, the least square channel estimation units 224 and 226 based on a channel estimation scheme, which is know for to those of ordinary skill in the art, respectively estimate channel estimation values $H_1$ and $H_2$ according to the OFDM sub carriers signal vectors $Y_1$ and $Y_2$. One of the familiar channel estimation method is least square channel estimation method. The vector expression of channel estimation values of $H_1=[H_{1,0}, H_{1,1}, H_{1,2}, \ldots, H_{1,K-1}]$ and $H_2=[H_{2,0}, H_{2,1}, H_{2,2}, \ldots, H_{2,K-1}]$, which $H_{b,d}$ represents the channel estimation value of the $d^{th}$ sub carrier corresponding to the $b^{th}$ antenna. The combining unit 202 is utilized to receive the OFDM sub carriers signal vectors $Y_1$ and $Y_2$.

Due to the Maximal Ratio Combining (MRC) scheme, the outputs of the dual receiving antennas are linearly combined so as to maximize the instantaneous SNR. Such that for each sub carrier, e.g. the $d^{th}$ sub carrier, the frequency domain signals $Y_{1,d}$ and $Y_{2,d}$ of each antennae are combined to obtain a combined signal S_COMB$_d$ according to a combining coefficient vector $W_d=[W_{1,d}\ W_{2,d}]$. The combining operation is shown below:

$$S\_COMB_d = \sum_{b=1}^{2} W_{b,d}^* \cdot Y_{b,d}$$

An initial value of the combining coefficient vector $W_d$ is estimated according to the channel estimation values $H_{1,d}$ and $H_{2,d}$ of the $d^{th}$ sub carrier from the least square channel estimation units 224 and 226. The calculation of a preliminary combining coefficient $W_{b,d}$ is shown below:

$$W_{b,d} = \frac{H_{b,d}}{\sum_{i=1}^{2} |H_{i,d}|^2}$$

Please note that the denominator of the above formula shows that the combining unit 202 already integrates the operation of equalization. Additionally, FIG. 2 shows the present invention applied to two antennae, but the present invention can also be applied to more than two antennae and the present invention does not limit the number of antennae.

To further alleviate the effect of phase noise, a decision feedback algorithm recovers the transmitted signals according to the received signals in order to adaptively optimize the combining coefficient vector. The decision feedback algorithm passes the combined signals through a decoding process to retrieve the transmitted information of the received signals according to the wireless communication system. The transmitted information is then fed back into an emulation of the encoding process according to the wireless communication system. The emulation of the encoding process recovers the transmitted signal, which is an estimation of the transmitted signal according to the transmitted information. The decision feedback process proceeds over a plurality of OFDM symbols, and the resulting recovered signals then feedback to update the combining coefficient vector $W_d$ to minimize the average mean square error between the recovered signals and the combined signals over pluralities of OFDM symbols. The decoding process is according to the format and specification of wireless communication system, for an OFDM system the decoding process includes phase and/or amplitude de-modulation, de-interleave and convolutional decode. The emulation of encoding process reverse the operation of the decoding process which includes convolutional code, interleave and phase and/or amplitude modulation for an OFDM system.

The detailed operation is described below for this embodiment. For the sake of brevity, the description is only for the case of the $d^{th}$ sub carrier. The demodulator 204 operates a phase and/or amplitude demodulation, which demodulates the combined signal $S\_COMB_d$ to generate a demodulated signal $S\_DEM_d$. The de -interleaver 206 performs a de-interleaving operation on the demodulated signal $S\_DEM_d$, to generate a de-interleaved signal $S\_DEINT_d$. The decoding unit 208 (e.g. a related art Viterbi decoder) performs a convolutional decoding on de-interleaved signal $DEINT_d$ to output a decoded signal $S\_DEC_d$.

In the feedback encoding path, the coding unit 210 performs a convolutional coding operation on the decoded signal $S\_DEC_d$ to generate a coded signal $S\_COD_d$. The interleaver 212 performs a de-interleaving operation on the coded signal $S\_COD_d$ to generate an interleaved signal $S\_INT_d$. The modulator 214 modulates the interleaving signal $S\_INT_d$ to generate a desired signal $X_d$, which is recovery of the transmitted signal according to the decoded signal. The decoding/encoding process proceeds over a plurality of OFDM symbols, and the results are fed to the combining coefficient estimation unit 216 for updating the combining coefficient vector $W_d$ according to sub carrier signals $Y_{1,d}(n)$ $Y_{2,d}(n)$, n=1, . . . ,N (N is an integer) and the desired signals $X_d(n)$, n=1, . . . ,N, in which n is the symbol index specifies the OFDM symbols within OFDM signal. The updating formula is shown as below:

$$W_d = R_d^{-1} r_d \quad \text{Formula (1)}$$

where $R_d = [R_{ij}]$ is an $N_B \times N_B$ matrix, $N_B$ is the number of antennae. The matrix represents an autocorrelation matrix of the sub carrier signal vector $Y_d$.

$$R_{ij} = \frac{1}{N} \sum_{n=1}^{N} Y_{i,d}(n) \cdot Y_{j,d}^*(n) \quad \text{Formula (2)}$$

where it is understood that the multiplication of the sub carrier signal $Y_{i,d}(n)$ and the complex conjugate of the other sub carrier signal $Y_{j,d}(n)$ is the inner product of these two sub carrier signals.

Additionally, $r_d = [r_i]$ is an $N_B \times 1$ matrix, which represents a cross-correlation matrix of the sub carriers signal and the desired signal, where $r_i$ is represented as:

$$r_i = \frac{1}{N} \sum_{n=1}^{N} Y_{i,d}(n) \cdot X_d^*(n) \quad \text{Formula (3)}$$

Through the average over pluralities of OFDM symbols which represents an average over time domain, the phase noise effect is significantly alleviated. The updated combining coefficient vector $W_d$ is outputted to the combining unit 202. The combining unit 202 performs the combining operation on the sub carrier signals $Y_{1,d}(n)$, $Y_{2,d}(n)$, n=1, . . . ,N according to the updated combining coefficient, and then output the result to the later demodulator 204 and de-interleaver 206. Finally, the signal $S\_DEC_d$ decoded from the decoding unit corresponds to the decoding result of the $d^{th}$ sub carrier. The combining coefficient vector $W_d$ updated by the combining unit 202 adaptively compensates the phase noise effect, the accuracy of the OFDM receiving system is improved.

As shown in formulae (2) and (3), the combining coefficient estimation unit 216 of the present embodiment calculates the matrices $R_d$ and $r_d$ through the average over a plurality of OFDM symbols, which represents the average over time domain. If a system's coherent bandwidth is enough, the matrix $R_d$ also could also be an average over the time -frequency domain, which calculates over a plurality of OFDM symbols and a plurality of sub carriers. For example, $$R_{ij} = \frac{1}{N \cdot |D|} \sum_{k \in D} \sum_{n=1}^{N} Y_{i,k}(n) \cdot Y_{j,k}^*(n) \quad \text{Formula (4)}$$

wherein D is a set of sub carriers, and |D| represents the number of sub carriers in the set D. Taking D=[d−1 d d+1] as an example, an average operation on formula (4) is performed over a time-frequency domain to obtain $R_{ij}$ corresponding to the $d^{th}$ sub carrier wherein there are three sub carriers (d−1, d, and d+1) over the time-frequency domain.

$$r_i = \frac{1}{N \cdot |D|} \sum_{k \in D} \sum_{n=1}^{N} Y_{i,k}(n) \cdot X_k^*(n) \quad \text{Formula (5)}$$

Figure 3:
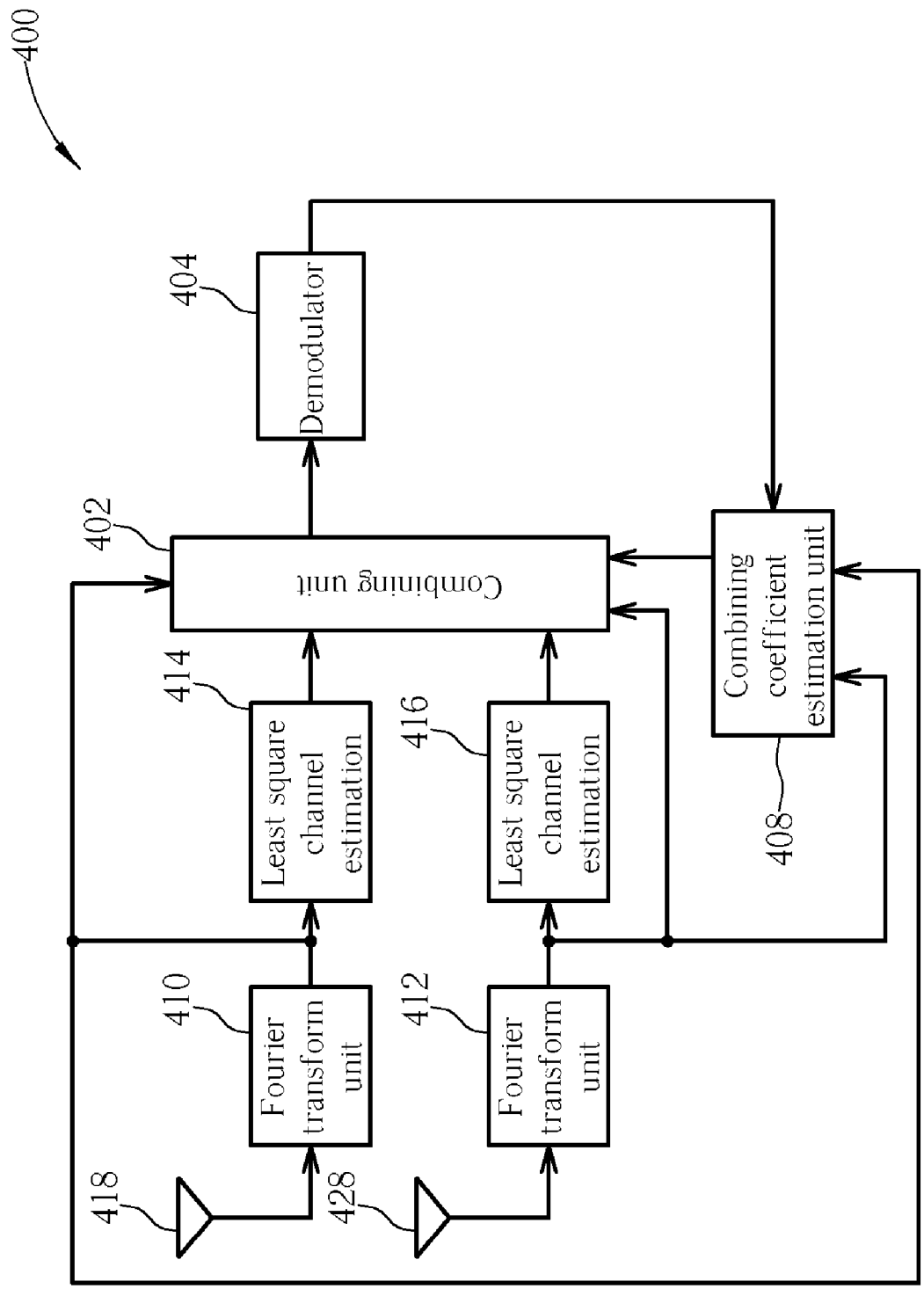
FIG. 3 is a schematic diagram of a combining coefficient estimation apparatus according to a second embodiment of the present invention.

Please refer to FIG. 3. FIG. 3 is a schematic diagram a second embodiment of the present invention. The key difference between the second embodiment and the first embodiment is the decision feedback scheme of the second embodiment is a hard decision scheme, which determines the transmitted information then feedback to facilitate the combining coefficient vector updating. The combining coefficient estimation apparatus 400 applied in an OFDM receiving apparatus comprises a combining unit 402, a demodulator 404, a combining coefficient estimation unit 408, a plurality of Fourier transform units 410 and 412, a plurality of least square channel estimation units 414 and 416, and a plurality of antennae 418 and 420. Except for the demodulator 404, the elements of the same name in the first and second embodiment have the same function and operation, therefore detailed description is omitted for the sake of brevity. In the second embodiment, the demodulator 404 in FIG. 3 is a hard decision maker. Comparing FIG. 2 with FIG. 3, the architecture of the OFDM receiving apparatus 400 is similar to the OFDM receiving apparatus 200. The key difference is that the hard decision demodulated signal generated by outputted the demodulator 404 is directly fed to the combining coefficient estimation unit 408 to update the combining coefficient according to formulae (1), (2), and (3). As mentioned above, the desired signal generated from the modulator 214 and the demodulator 404 is an estimation of the transmitted signal according to the received and combined signal. Although the performance of the feedback decision algorithm based on the hard decision scheme is not so great as the first embodiment, it still compensates the phase noise effect by updating the combining coefficient vector.

Compared with the related art, the present invention OFDM receiving apparatus and related method recovers the transmitted signal according to the received signals in order to adaptively update the combining coefficient vector, which is initially obtained from the channel estimation by the least square channel estimation method. The present invention OFDM receiving apparatus and related method updates the combining coefficient vector which effectively alleviates the phase noise effect, and thereby raises signal receiving quality of an OFDM system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for receiving OFDM signals via at least two antennae, in which each OFDM signal includes a plurality of OFDM symbols, the method comprising:
    converting OFDM symbols received via each antenna to a plurality of sub carrier signals, wherein each sub carrier signal corresponds to one of a plurality of sub carriers;
    for a specified sub carrier, combining the sub carrier signals, which are obtained via each antenna and correspond to the specified sub carrier, based on a combining coefficient vector to form a combined signal;
    recovering a desired signal based on the combined signal corresponding to the specified sub carrier; and
    updating the combining coefficient vector based on the desired signal corresponding to the specified sub carrier and the sub carrier signals, which correspond to the specified sub carrier and are obtained via each antennae.

2. The method of claim 1, wherein the step of recovering the desired signal comprises:
    demodulating the combined signal to form a demodulated signal corresponding to the specified sub carrier;
    convolutional decoding the demodulated signal to form a decoded signal corresponding to the specified sub carrier;
    convolutional encoding the decoded signal to form a coded signal corresponding to the specified sub carrier; and
    modulating the coded signal to form the desired signal corresponding to the specified sub carrier.

3. The method of claim 2, wherein the step of convolutional decoding is performed by a Viterbi decoder.

4. The method of claim 1, wherein the step of recovering the desired signal is performed by a hard-decision maker.

5. The method of claim 1, wherein the step of updating the combining coefficient vector comprises:
    constructing a first matrix based on an autocorrelation of the sub carrier signals corresponding to the specified sub carrier obtained via each antennae;
    calculating an inversed first matrix according to the first matrix;
    constructing a second matrix based on a cross-correlation of the desired signal corresponding to the specified sub carrier and the sub carrier signals corresponding to the specified sub carrier obtained via each antennae; and
    calculating to update the combining coefficient vector by multiplying the inversed first matrix and second matrix.

6. The method of claim 5, wherein the first matrix is constructed by a plurality of first elements, wherein each first element is obtained according to an average, over a plurality of OFDM symbols, of an inner product of a pair of the sub carrier signals, wherein each one of a pair of the sub carrier signals is the sub carrier signal corresponding to the specified sub carrier obtained via one of the antennae; and
    wherein the second matrix is constructed by a plurality of second elements, wherein each second element is obtained according to an average, over a plurality of OFDM symbols, of an inner product of the desired signal corresponding to the specified sub carrier, and the sub carrier signal corresponding to the specified sub carrier obtained via one of the antennae.

7. The method of claim 5, wherein the first matrix is constructed by a plurality of first elements, wherein each first element is obtained according to an average, over a plurality of specified sub carriers and a plurality of OFDM symbols, of an inner product of a pair of sub carrier signals, wherein each one of a pair of sub carrier signals is the sub carrier signal corresponding to one of the plurality of specified sub carriers obtained via one of the antennae; and wherein the second matrix is constructed by a plurality of second elements, wherein each second element is obtained according an average, over a plurality of specified sub carriers and a plurality of OFDM symbols, of the inner product of the desired signal corresponding to one of the plurality of specified sub carriers and the sub carrier signal corresponding to one of the plurality of specified sub carrier obtained via one of the antennae.

8. The method of claim 2, wherein the step of recovering the desired signal further comprises:
    de-interleaving the demodulated signal corresponding to the specified sub carrier to form a de-interleaved signal;
    interleaving the coded signal corresponding to the specified sub carrier to form an interleaved signal; and
    wherein the decoded signal is formed by decoding the de-interleaved signal; and the desired signal is formed by modulating the interleaved signal.

9. An apparatus for receiving OFDM signals via at least two antennae, in which each OFDM signal includes a plurality of OFDM symbols, the apparatus comprising:
    a converter for converting the OFDM symbols received via each antenna to a plurality of sub carrier signals, wherein each sub carrier signal corresponds to one of a plurality of sub carriers;
    a combining unit for combining the sub carrier signals, which are obtained via each antenna and correspond to a specified sub carrier, based on a combining coefficient vector to form a combined signal;
    a recovery unit for recovering a desired signal based on the combined signal corresponding to the specified sub carrier; and
    a combining coefficient estimation unit for updating the combining coefficient vector corresponding to the specified sub carrier based on the desired signal corresponding to the specified sub carrier and the sub carrier signals, which correspond to the sub carrier and are obtained via each antennae.

10. The apparatus of claim 9, wherein the recovery unit comprises:
    a demodulator for demodulating the combined signal to form a demodulated signal corresponding to the specified sub carrier;
    a decoder for convolutional decoding the demodulated signal to form a decoded signal corresponding to the specified sub carrier;
    a coder for convolutional coding the decoded signal to form a coded signal corresponding to the specified sub carrier; and
    a modulator for modulating the coded signal to form the desired signal corresponding to the specified sub carrier.

11. The apparatus of claim 10, wherein the decoder is a Viterbi decoder.

12. The apparatus of claim 9, wherein the recovery unit is a hard decision maker.

13. The apparatus of claim 9, wherein the combining coefficient estimation unit comprises:
- a first matrix constructer for constructing a first matrix based on an autocorrelation of the sub carrier signals corresponding to the specified sub carrier obtained via each antenna;
- a matrix inverter for inversing the first matrix to form an inversed first matrix;
- a second matrix constructer for constructing a second matrix based on a cross-correlation of the desired signal corresponding to the specified sub carrier and the sub carrier signals corresponding to the specified sub carrier obtained via each antenna; and
- a multiplier for generating to update the combining coefficient vector by multiplying the inversed first matrix and the second matrix.

14. The apparatus of claim 13, wherein the first matrix comprises a plurality of first elements, wherein each first element is obtained according to an average, over a plurality of OFDM symbols, of an inner product of a pair of sub carrier signals, wherein each one of a pair of sub carrier signals is the sub carrier signal corresponding to the specified sub carrier obtained via one of the antennae; and wherein the second matrix comprises a plurality of second elements, wherein each second element is obtained according an average, over a plurality of OFDM symbols, of an inner product of the desired signal corresponding to the specified sub carrier and the sub carrier signal corresponding to the specified sub carrier obtained via one of the antennae.

15. The apparatus of claim 13, wherein the first matrix comprises a plurality of first elements, wherein each first element is obtained according to an average, over a plurality of specified sub carriers and a plurality of OFDM symbols, of an inner product of a pair of sub carrier signals, wherein each of a pair of sub carrier signals is the sub carrier signal corresponding to one of the plurality of specified sub carriers obtained via one of the antennae; and wherein the second matrix comprises a plurality of second elements, wherein each second element is obtained according an average, over a plurality of specified sub carriers and a plurality of OFDM symbols, of an inner product of the desired signal corresponding to one of the plurality of specified sub carriers and the sub carrier signal corresponding to one of the plurality of specified sub carrier obtained via one of the antennae.

16. The apparatus of claim 9, wherein the recovery unit further comprises:
- a de-interleaver for de-interleaving the demodulated signal to form a de-interleaved signal corresponding to the specified sub carrier; and
- an interleaver for interleaving the coded signal to form a interleaved signal corresponding to the specified sub carrier;
- wherein the decoder is for decoding the de-interleaved signal to form the decoded signal; and wherein the modulator is for modulating the interleaved signal to form the desired signal.

* * * * *